United States Patent Office 3,346,603
Patented Oct. 10, 1967

3,346,603
3β-ACETOXYPREGN-4-ENE-6,20-DIONES AND
THEIR PREPARATION
Yvon Lefebvre, Pierrefonds, Quebec, and Peter F.
Morand, Ottawa, Ontario, Canada, assignors to
American Home Products Corporation, New York,
N.Y., a corporation of Delaware
No Drawing. Filed Jan. 26, 1965, Ser. No. 428,252
12 Claims. (Cl. 260—397.4)

This application is a continuation-in-part of our co-pending U.S. patent application Ser. No. 285,210, filed June 4, 1963 (now abandoned).

This invention relates to certain novel 3β-acetoxypregn-4-ene-6,20-diones of the general Formula I and to methods for their preparation.

The compounds of this invention are useful as intermediates in the preparation of 3β-acetoxy-6-chloropregna-4,6-dien-20-ones (IIa), 3β-hydroxy-6-chloropregna-4,6-dien-20-ones (IIb), and 6-chloro-6-dehydroprogesterones (III), which are powerful progestational agents. These active progestational agents may be prepared from the new compounds of this invention, the 3β-acetoxypregn-4-ene-6,20-diones of Formula I by the following process. A 3β-acetoxypregn-4-ene-6,20-dione as described by Formula I is treated in solution in an inert solvent with phosphorus pentachloride at room temperature, with stirring. The reaction is terminated, for instance by addition of pyridine, and the mixture is poured into ice-cold bicarbonate solution. Extraction with a water-immiscible solvent and evaporation of the latter yields the desired 3β-acetoxy-6-chloropregna-4,6-dien-20-one. The last-named compound is hydrolyzed with, for example, potassium bicarbonate in aqueous alkanol to obtain the corresponding 3β-hydroxy-6 - chloropregna-4,6-dien-20-one, and the latter compound is oxidized, for example with chromic acid in acetone solution, to obtain the corresponding 6-chloropregna-4,6-diene-3,20-dione. One of the compounds which may be obtained in this manner is 17α-acetoxy-6-chloropregna - 4,6 - diene-3,20-dione, the well-known drug chlormadinone.

This relationship may be represented by the following formulae:

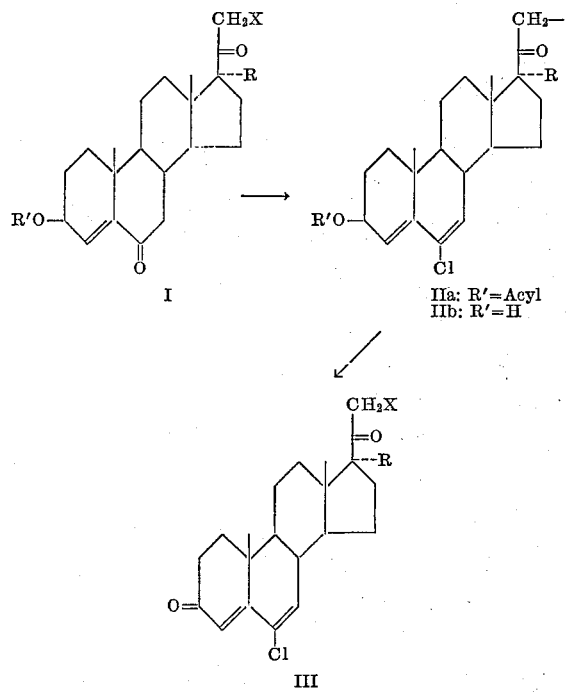

In these formulae R' represents hydrogen or an acyl group; R represents hydrogen, a straight-chain lower alkyl group of from one to four carbon atoms, or an acyloxy group; and X represents hydrogen or fluorine.

More specifically, this invention relates to compounds of the general Formula I in which R', R and X have the significance defined above. Such compounds may be prepared by one of the three methods now to be described.

METHOD A

A suitably substituted 3-acylated pregnenolone (IV) (as numbered below) is treated with an epoxidizing agent, such as, for example, an organic peracid, to yield a mixture of the corresponding 5,6-epoxides of Formula V, in which R' represents an acyl group. This reaction is carried out in a manner similar to that described by L. F. Fieser and M. Fieser, "Steroids," 1959, p. 193 and pp. 196–197, Reinhold Publishing Corp., N.Y. Preferred conditions for this reaction include the use of buffered peracetic acid as an epoxidizing agent, chloroform as a solvent for the steroid, reaction temperatures in the vicinity of 0° C., and two hours reaction time.

The epoxide ring of the compounds of that mixture may be opened by one of the methods described in Fieser and Fieser, cited above, p. 196. Preferred conditions include the use of periodic acid in aqueous acetone solution, and refluxing the mixture for periods of time of thirty minutes. In this manner the corresponding 5α,6β-dihydroxy compounds of Formula VI, in which R' represents an acyl group, are obtained and isolated in a conventional manner. The latter compounds are in turn oxidized by oxidative methods known per se, such as chromic acid in acetone solution as described, for example, by C. Djerassi, J. Org. Chem., vol. 21, p. 1547 (1956). Preferred conditions include operating temperatures of about +10° C. and reaction times of a few minutes. In this manner the 3β-acylated-5α-hydroxypregnane-6,20-diones of Formula VII are obtained.

Alternatively, those latter compounds may also be obtained by treating the 3β-acylated-5,6-epoxides of Formula V with chromic acid in acetone solution in the manner described by Leo Knof, Liebig's Annalen, vol. 647, p. 53 (1961). Preferred conditions for that latter reaction include operating temperatures of 0° C. to room temperature and reaction times of about 10 to 15 minutes.

The 3β-acyloxy-5α-hydroxypregnane-6,20-diones of Formula VII obtained as above are dehydrated by treatment with thionyl chloride to obtain the desired 3β-acyloxypregn-4-ene-6,20-diones of Formula I. Preferred conditions for the above reaction include the use of thionyl chloride in pyridine solution and an operating temperature of about 0° C.

METHOD B

A 3β-acyloxypregn-5-en-20-one of Formula IV is first treated with formic acid and hydrogen peroxide in the manner described by L. F. Fieser and S. Rajagopalan in J. Am. Chem. Soc., vol. 71, p. 3938 (1949) to obtain the corresponding 3β-acyloxy-6β-formyloxy-5α-hydroxypregnan-20-one, which is hydrolyzed as such, without purification, to yield the corresponding 3β,5α,6β-trihydroxypregnan-20-one. Preferred conditions for this reaction include the use of a mixture of 88 percent formic acid and 30 percent hydrogen peroxide at room temperature with a reaction time of about three hours, followed by hydrolysis with 10 percent potassium hydroxide in aqueous methanol at reflux temperature for one hour. Alternatively, when starting with a 3β-hydroxypregn-5-en-20-one, the resulting intermediate is the corresponding 3β,6β-diformyloxy-5α-hydroxypregnan-20-one, which is hydrolyzed as above to yield the desired 3β,5α,6β-trihydroxypregnan-20-one.

The later trihydroxylated compound is oxidized by means of N-bromosuccinimide in the manner cited above to yield the corresponding 3β,5α-dihydroxypregnane-6,20-dione of Formula IX. Preferred conditions for this reaction include operating temperatures of about +5° C. and reaction times of approximately two hours.

The 3β,5α-dihydroxypregnane-6,20-dione obtained as above is, in turn, acylated in the conventional manner to the corresponding 3β-acyloxy-5α-hydroxypregnane-6,20-dione of Formula VII which, in turn, is dehydrated to the desired end-product of Formula I as described above in Method "A."

METHOD C

A 3β-acyloxypregn-5-en-20-one of Formula IV is treated with a hypohalous acid such as, for example, hypobromous or hypochlorous acid, in the manner described, for example, by Ueno in J. Pharm. Soc., Japan, vol. 72, p. 1622 (1952); V. Grenville, D. K. Patel, V. Petrow, I. A. Stuart-Webb, and D. M. Williamson in J. Chem. Soc., 1957, p. 4105; or S. Mori in J. Chem. Soc., Japan, vol. 64, p. 981 (1943) or ibid., vol. 71, p. 600 (1950). Preferred conditions include the use of N-bromosuccinimide or N-bromacetamide and perchloric acid, with operating temperatures of about room temperature and reaction times of about 35 minutes. The resulting 3β-acyloxy-5α-(chloro- or bromo-)-6β-hydroxypregnan-20-one of Formula X is then oxidized by means of chromic acid in pyridine as described by V. Grenville, D. K. Patel, V. Petrow, I. A. Stuart-Webb, and D. M. Williamson in J. Chem. Soc. (1957), p. 4105, or by chromic acid in acetone as described by A. Bowers, E. Denot, L. C. Ibanez, Ma. E. Cabezas, and H. J. Ringold in J. Org. Chem., vol. 27, p. 1862 (1961) to yield the corresponding 3β-acyloxy-5α-(chloro- or bromo-) pregnane-6,20-dione of Formula XI. Preferred conditions include the use of the 5α-bromo intermediate, chromic acid in acetone solution as the oxidizing agent, operating temperatures of about +10° C., and a few minutes reaction time.

The resulting 3β-acyloxy-5α-(chloro- or bromo-) pregnane-6,20-dione is then dehydrohalogenated by treatment with an organic base such as, for example, pyridine, as described by I. M. Heilbron, E. R. H. Jones and F. S. Spring in J. Chem. Soc., 1937, p. 801. Referred conditions include the use of pyridine at reflux temperature, and reaction times of approximately three hours.

The following formulae and examples will illustrate our invention, the compounds being numbered to correspond with the foregoing description, with Y in Formulae X and XI representing chlorine or bromine.

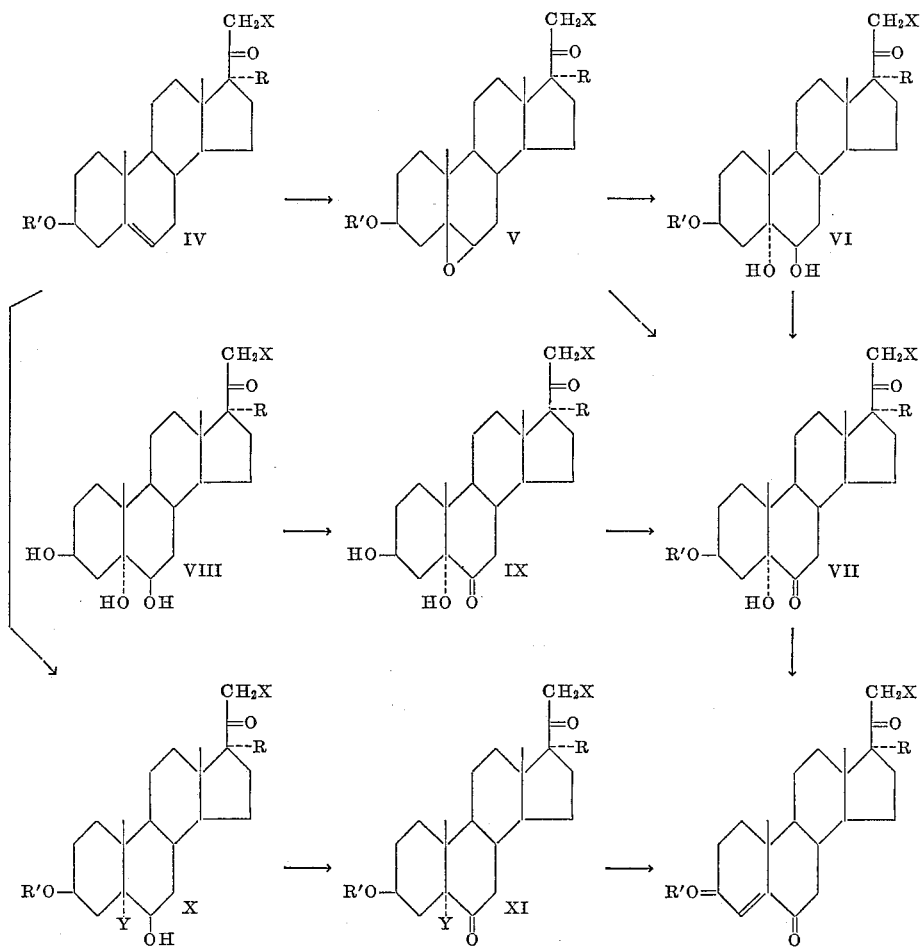

In these formulae, as above defined, R' represents hydrogen or an acyl group; R represents hydrogen, as straight-chain lower alkyl group of from one to four carbon atoms, or an acyloxy group, and X represents hydrogen or fluorine.

EXAMPLE 1

*3β-acetoxy-5α-hydroxypregnane-6,20-dione*

To a suspension of sodium acetate (2.66 g.) and peracetic acid (30 cc.), cooled at 0° C., is added dropwise, to maintain the temperature at 0° C., a solution of pregnenolone acetate (30 g.) in chloroform (215 cc.). The mixture is then stirred at 0° C. for 2 hours. The chloroform solution is washed free of acid, dried and evaporated, leaving a crude mixture of the 5α, and 5β-epoxides.

This mixture of epoxides (29.9 g.) is dissolved in acetone (300 cc.). A solution of periodic acid (18 g.) in water (90 cc.) is added and the solution is refluxed for 30 minutes. Addition of water gives a precipitate. The solid product is filtered off, washed with water and dried.

The crude diol thus obtained (31.7 g.) is dissolved in acetone (1250 cc.) and the solution is cooled to +10° C. A solution of chromic acid 8 N (55 cc.) is added dropwise. After stirring for a few minutes the reaction mixture is poured on ice and water. The resulting solid is filtered, washed with water and dried. After crystallization from methylene chloride-hexane, pure 3β-acetoxy-5α-hydroxypregnane-6,20-dione, melting at 224–226° C., was secured.

EXAMPLE 2

*3β-acetoxy-5α-hydroxypregnane-6,20-dione*

A suspension of pregnenolone acetate (10 g.) in 100 cc. of 88 percent formic acid and 30 percent hydrogen peroxide (10 cc.) is stirred at room temperature for 3 hours. The solution is poured in ice-water and the resulting solid is filtered, washed free of acid and dried. This solid is dissolved in methanol (100 cc.) and the solution is refluxed for one hour with 10 percent potassium hydroxide (30 cc.). Water is added to the yellow solution and the precipitate is filtered, washed free of base and dried. This solid product is 3β,5α,6β-trihydroxypregnan-20-one; melting at 258–262° C.

This triol (6.7 g.) is dissolved in methanol (500 cc.) and ether (320 cc.). N-bromosuccinimide (8.4 g.) and water (200 cc.) are added and the solution is left at +5° C. for 2 hours. The bromine is removed from the solution by adding a solution of 0.1 N sodium thiosulfate. Ether is then evaporated at room temperature, under vacuum, i.e. at a pressure less than atmospheric, and the residual solution is diluted with water. The resulting solid is filtered, washed with water and dried.

Acetylation of the 6-keto-diol thus formed (5.6 g.) with acetic anhydride and pyridine gives the crude 3β-acetoxy-5α-hydroxypregnane-6,20-dione. Crystallization from methylene chloride-hexane gives the pure hydroxy-ketone, melting at 223–225° C., identical with the product obtained in Example 1.

EXAMPLE 3

*3β-acetoxypregn-4-ene-6,20-dione*

To a solution of 3β-acetoxy-5α-hydroxypregnane-6,20-dione (26.1 g.) dissolved in dry pyridine (260 cc.) at 0° C. is added dropwise a solution of thionyl chloride (26 cc.) in pyridine (51 cc.). The mixture is stirred at 0° C. for 1 hour. The solution is diluted with ice-water and the resulting solid is filtered off, washed free of base and dried. Purification by chromatography and crystallization from methylene chloride-hexane gives the pure 3β-acetoxypregn-4-ene-6,20-dione, melting at 147–149° C.; $[\alpha]_D = -3°$.

Analysis confirmed the empiric formula $C_{23}H_{32}O_4$.
Required: C, 74.17%; H, 8.66%.
Found: C, 74.03%; H, 8.80%.

EXAMPLE 4

*3β-acetoxy-5α-bromo-6β-hydroxypregnan-20-one*

To a solution of 3β-acetoxypregn-5-en-20-one (12.0 g.) in dioxane (240 ml.) and water (60 ml.) are added N-bromosuccinimide (8.4 g.) and a solution of perchloric acid (2.4 ml., 72 percent) in water (12.0 ml.). The reaction mixture is stirred at room temperature for 35 minutes. Sodium bicarbonate is added until the color is discharged and then water (400 ml.) is added, with vigorous stirring. This is extracted with ether and the combined extracts are washed with aqueous sodium bicarbonate solution and water. Removal of the solvent after drying the solution over magnesium sulfate leaves an oil which crystallized from acetone-hexane to give the bromohydrin, 3β-acetoxy-5α-bromo-6β-hydroxypregnan-20-one, melting point 159–160° C. (dec.).

EXAMPLE 5

*3β-acetoxy-5α-bromopregnane-6,20-dione*

An 8 N solution (7.0 ml.) of $CrO_3$ in sulfuric acid and water is added to a solution of 3β-acetoxy-5α-bromo-6β-hydroxypregnan-20-one (6.4 g.) is purified acetone (60 ml.) at a temperature of 15° C. The reaction mixture is stirred for 15 minutes at the latter temperature and then diluted with water. After extracting with ethyl acetate the combined extracts are washed with aqueous sodium bicarbonate and water. The solution is dried over magnesium sulfate and evaporated leaving a white solid, 3β-acetoxy-5α-bromopregnane-6,20-dione, melting at 170–171° C. (dec.).

EXAMPLE 6

*3β-acetoxypregn-4-ene-6,20-dione*

A solution of 3β-acetoxy-5α-bromopregnane-6,20-dione (7.7 g.) in pyridine (20 ml., freshly distilled over potassium hydroxide) is refluxed for 3 hours. Water is added to the cooled solution and the yellow solid which precipitates is collected by filtration. Two crystallizations from aqueous methanol give light yellow needles; of 3β-acetoxypregn-4-ene-6,20-dione, M.P. 145–146° C. A mixed melting point determination with an authentic sample of 3β-acetoxypregn-4-ene-6,20-dione is undepressed.

EXAMPLE 7

*3β-acetoxy-5α-hydroxy-17α-methylpregnane-6,20-dione*

The starting material was 3β-acetoxy-17α-methyl-5ξ,6ξ-oxidopregnan-20-one, which has been described by Deghenghi, Lefebvre, Mitchell, Morand and Gaudry in Tetrahedron, vol. 19, p. 289 (1963).

To a solution of 3β-acetoxy-17α-methyl-5ξ,6ξ-oxidopregnan-20-one (2 g.) in acetone (35 cc.) at 0–5° C. there is added a solution of 8 N chromic acid (3 cc.). The reaction mixture is stirred for 10 minutes at room temperature and then poured into ice-water. The resulting solid is filtered off and washed free of acid. There is thus obtained crude 3β-acetoxy-5α-hydroxy-17α-methylpregnane-6,20-dione of melting point 226–234° C. Crystallization from methylene chloride-hexane raises the melting point to 233–240° C.

EXAMPLE 8

*3β-acetoxy-17α-methylpregn-4-ene-6,20-dione*

The starting material was 3β-acetoxy-5α-hydroxy-17α-methylpregnane-6,20-dione, prepared as described above.

To an ice-cold solution of 6.7 g. of 3β-acetoxy-5α-hydroxy-17α-methylpregnan-6,20-dione in 67 cc. of pyridine, thionyl chloride (6.7 cc.) is added. The mixture is left at 0° C. for 15 minutes. The reaction mixture is poured in ice-water and the resulting solid is filtered, washed with water and dried. Purification by chromatography and crystallization from acetone-hexane gives pure 3β-acetoxy-17α-methylpregn-4-ene-6,20-dione; melting point of 206–208° C.; $[\alpha]_D = -69.2°$. The maximum of absorption is at 238 mμ with an extinction coefficient of 9250.

Analysis confirmed the empiric formula $C_{24}H_{34}O_4$.
Required: C, 74.57%; H, 8.87%.
Found: C, 74.42%; H, 8.69%.

EXAMPLE 9

*3β-acetoxy-5α-bromo-6β-hydroxy-17α-methylpregnan-20-one*

The starting material was 3β-acetoxy-17α-methylpregn-5-en-20-one, which compound was described by Plattner et al. in Helv. Chim. Acta 32, 270, (1949).

To a solution of 3β-acetoxy-17α-methylpregn-5-en-20-one (11.0 g.) in dioxane (176 ml.) and water (6.6 ml.) is added N-bromosuccinimide (7.7 g.) followed by perchloric acid (2.2 ml., 72 percent) in water (11.0 ml.). The reaction mixture is stirred at room temperature for 30 minutes. Then solid sodium bisulfite is added, and the reaction mixture poured into ice-water, extracted with ether, washed, dried and the solvent removed by evaporation to yield the crude product. Crystallization from acetone-hexane gives the bromohydrin, 3β-acetoxy-5α-bromo-6β-hydroxy-17α-methylpregnan-20-one; melting at 166–168° C. (dec.). An analytical sample has a melting point of 175–176° C. (dec.); [α]$_D$=—49°.

Analysis confirmed the empiric formula $C_{24}H_{37}O_4Br$ (469.46).

Required: C, 61.40%; H, 7.94%.
Found: C, 61.62%; H, 8.04%.

EXAMPLE 10

*3β-acetoxy-5α-bromo-17α-methylpregnane-6,20-dione*

A solution of 3β-acetoxy-5α-bromo-6β-hydroxy-17α-methylpregnan-20-one (0.72 g.) in purified acetone (20 ml.) is cooled to 15° C. with stirring and there is added to it an excess amount of 8 N solution of chromic acid in sulfuric acid and water. Stirring was continued for 6 minutes; then water is added and the reaction mixture is worked up in the way described for the preparation of 3β-acetoxy-5α-bromopregnane-6,20-dione. The crude product, 3β-acetoxy-5α - bromo - 17α - methylpregnane - 6,20-dione, has a melting point of 181–182° C. (dec.) and, after two crystallizations from acetone, the melting point is 184–185° C. (dec.).

EXAMPLE 11

*3β-acetoxy-17α-methylpregn-4-ene-6,20-dione*

A solution of 3β-acetoxy-5α-bromo-17α-methylpregnane-6,20-dione (0.20 g.) in pyridine (5 ml., freshly distilled over potassium hydroxide) is refluxed for 3 hours. After cooling, the solution is diluted and the yellow solid which precipitated, 3β-acetoxy-17α-methylpregn-4-ene-6,20-dione, is collected by filtration. It has a melting point of 200–202° C., which is raised to 205–207° C. after one crystallization from methylene chloride-hexane. A mixed melting point determination with an authentic sample of 3β-acetoxy-17α - methylpregn-4-ene-6,20 - dione is undepressed.

EXAMPLE 12

*21-fluoro-17α-methyl-3β,5α,6β-trihydroxypregnan-20-one*

The starting material was 21-fluoro-17α-methylpregnenolone acetate which was described in the copending patent application of Lefebvre, Ser. No. 197,252, filed May 24, 1962, now Patent No. 3,174,968, issued Mar. 23, 1965.

A mixture of 21-fluoro-17α-methylpregnenolone acetate (16.2 g.), formic acid (160 cc.) and 30 percent hydrogen peroxide solution (16.2 cc.) is stirred at room temperature for three hours. The mixture is poured in ice-water. The resulting solid is filtered, washed with water, and dried.

The solid (19.5 g.) is then refluxed for one hour with potassium hydroxide 10 percent (80 cc.) in methanol (240 cc.). The solution is poured in ice water. The solid is filtered, washed with water and dried. This solid product resulting is 21-fluoro-17α-methyl-3β,5α,6β-trihydroxypregnan-20-one; M.P. 288–291° C.

EXAMPLE 13

*3β-acetoxy-21-fluoro-5α-hydroxy-17α-methylpregnane-6,20-dione*

A mixture of the above triol (13.6 g.), methanol (1000 cc.), ether (650 cc.), N-bromosuccinimide (120 g.) and water (300 cc.) is left at 5° C. for two hours. The bromine is destroyed by addition of a 0.1 N solution of sodium thiosulfate (325 cc.). The ether is evaporated off under vacuum. Then the residual solution is diluted with water and the solid is filtered off, washed with water and dried; M.P. 267–274° C. (dec.). This solid is identified as 3β,5α-dihydroxy-21-fluoro-17α-methylpregnane - 6,20-dione.

Acetylation of this compound (11.2 g.) with acetic anhydride (100 cc.) and pyridine (100 cc.) overnight gives, after workup, a solid which upon crystallization from methylene chloride-hexane yields pure 3β-acetoxy-21-fluoro-5α-hydroxy-17α-methylpregnane-6,20-dione; M.P. 263–266° C. [α]$_D$=83.9° C.

Analysis confirmed the empiric formula $C_{24}H_{35}O_5F$.
Required: C, 68.22%; H, 8.35%; F, 4.50%.
Found: C, 68.18%; H, 8.11%; F, 4.53%, 4.40%.

EXAMPLE 14

*3β-acetoxy-21-fluoro-17α-methylpregn-4-ene-6,20-dione*

A solution of 3β-acetoxy-21-fluoro-5α-hydroxy-17α-methylpregnan-6,20-dione (8.69 g.) in pyridine (85 cc.) is cooled at 0° C. A solution of thionyl chloride (8.6 cc.) in pyridine (15 cc.) is added dropwise, and then the mixture is stirred at 0° C. for one hour. The mixture is poured in ice-water and the solid filtered off, washed with water and dried. Purification by chromatography on "Florisil" and crystallization from methylene chloride-hexane gives pure 3β-acetoxy-21-fluoro-17α-methylpregn-4-ene-6,20-dione; M.P. 196–197° C.

Analysis confirmed the empiric formula $C_{24}H_{33}O_4F$.
Required: F, 4.70%.
Found: F, 4.70%, 4.78%.
Other constants: $\lambda_{max}$. 237 mμ, ε=7380.

EXAMPLE 15

*3β,17α-diacetoxy-5α,6β-dihydroxypregnan-20-one*

The starting material was 17α-acetoxypregnenolone acetate, which has been described by R. B. Turner in J. Am. Chem. Soc. 75, 3489, (1953).

To a suspension of sodium acetate (900 mg.) and peracetic acid (9 cc.), cooled at 0° C., is added dropwise a solution of 17α-acetoxypregnenolone acetate (8.97 g.) in chloroform (65 cc.). During the addition the temperature is kept between —2° C. and +2° C. The mixture is then stirred for two hours at 0° C.

The chloroformic solution is washed with water, sodium bicarbonate and water, dried and evaporated, leaving a colorless solid consisting of a mixture of α and β epoxides. To a solution of the above mixture of epoxides (1 g.) in acetone (10 cc.) is added a solution of periodic acid (0.6 g.) and water (3 cc.). The mixture is refluxed for thirty minutes. A crystalline precipitate soon forms.

The reaction mixture is diluted with ice-water and the resulting solid is filtered, washed with water, and dried. This solid is 3β,17α-diacetoxy-5α,6β-dihydroxypregnan-20-one; M.P. 303–305° C.

EXAMPLE 16

*3β,17α-diacetoxy-5α-hydroxypregnane-6,20-dione*

To a solution of 3β,17α-diacetoxy-5α,6β-dihydroxypregnan-20-one (903 mg.) in acetone (100 cc.), cooled at +10° C., is added a solution of 8 N chromic acid (1.5 cc.). Stirring is continued for two minutes and the mixture is poured on ice-water and the solid is filtered, washed with water and dried. A solid product melting at 268–271° C. resulted. Crystallization of this solid gives pure 3β,17α-diacetoxy-5α-hydroxypregnane - 6,20-dione (methylene chloride-hexane), M.P. 273–275° C.; [α]$_D$=—75.2° (CHCl$_3$).

Analysis confirmed the empiric formula $C_{25}H_{36}O_7$.
Required: C, 66.94%; H, 8.36%.
Found: C, 66.68%; H, 8.09%.

EXAMPLE 17

*17α-acetoxy-3β,5α,6β-trihydroxypregnan-20-one*

A solution of 17α-acetoxypregnenolone (5 g.) in formic acid (50 cc.) is heated on the steam bath for ten minutes. To the cool solution 30 percent hydrogen peroxide (5 cc.)

is added, and the mixture is stirred at room temperature for three hours. The solution is poured on ice-water and the solid is filtered off, washed with water and dried.

This solid is dissolved in methanol (75 cc.) and the solution is boiled on a steam bath for ten minutes with 10 percent potassium hydroxide (15 cc.). The solution is again poured in ice-water and the new solid is filtered, washed with water and dried. This solid product, 17α-acetoxy-3β,5α,6β-trihydroxypregnan-20-one melts at 302–304° C.

EXAMPLE 18

*3β,17α-diacetoxy-5α-hydroxypregnane-6,20-dione*

The above triol (3.1 g.) is dissolved in methanol (245 cc.) and ether (155 cc.). To this solution N-bromosuccinimide (4.1 g.) and water (90 cc.) are added and the reaction mixture is left at 5° C. for two hours.

The bromine is decomposed with a 0.1 N solution of sodium thiosulfate and the ether is evaporated at room temperature. The residual solution is diluted with water and the resulting solid is filtered and dried.

This solid is 17α-acetoxy-3β,5α-dihydroxypregnan-6,20-dione (2.5 g.) which is acetylated overnight at room temperature with pyridine (25 cc.) and acetic anhydride (25 cc.).

The solution is diluted with ice-water and the mixture extracted with methylene chloride. After washing with acid to remove the pyridine and then with a base to remove the acids, the methylene chloride solution was washed with water, dried and evaporated to dryness. Crystallization from methylene chloride-hexane gives the pure product 3β,17α-diacetoxy-5α-hydroxypregnane-6,20-dione; M.P. 273–275° C.

EXAMPLE 19

*3β,17α-diacetoxypregn-4-ene-6,20-dione*

To a solution of 3β,17α-diacetoxy-5α-hydroxypregnane-6,20-dione (5.34 g.) in dry pyridine (55 cc.) is added dropwise with stirring, at 0° C. a solution of thionyl chloride (5.33 cc.) in pyridine (10 cc.). The mixture is stirred for one hour at 0° C. The mixture is then poured in ice-water and the resulting solid is filtered, thoroughly washed with water and dried; M.P. 183–186° C. Chromatography on "Florisil" and crystallization from methylene chloride-hexane gives the pure product, 3β,17α-diacetoxypregn-4-ene-6,20-dione; M.P. 200–202° C. Other constants: $\lambda_{max} 236 m\mu$, $\epsilon = 7660$.

EXAMPLE 20

*6-chloro-3β,17α-diacetoxypregna-4,6-dien-20-one*

To a solution of 5 g. of 3β,17α-diacetoxypregn-4-ene-6,20-dione in 250 cc. of carbon tetrachloride, 5 g. of phosphorus pentachloride are added and the mixture is stirred at room temperature for 30 minutes. The reaction is stopped by the addition of 10 cc. of pyridine. The mixture is poured into an ice-cold sodium bicarbonate solution and is extracted with ether. The ether layer is washed with sodium bicarbonate and water. After drying and evaporating the solvents, the residue is crystallized from methanol to yield 6-chloro-3β,17α-diacetoxypregna-4,6-dien-20-one; M.P. 203–204° C. (dec.).

We claim:
1. A compound of the formula

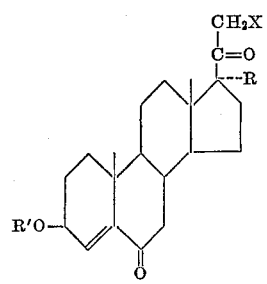

where R is a member selected from the group consisting of hydrogen, straight-chain lower alkyl groups of from one to four carbon atoms, and acetoxy; R' is a member selected from the group consisting of hydrogen and acetyl; and X is a member selected from the group consisting of hydrogen and fluorine.

2. 3β-acetoxypregn-4-ene-6,20-dione.
3. 3β-acetoxy-17α-methylpregn-4-ene-6,20-dione.
4. 3β-acetoxy-21-fluoro-17α - methylpregn-4-ene-6,20-dione.
5. 3β,17α-diacetoxypregn-4-ene-6,20-dione.
6. 3β-acetoxy-21-fluoro-5α-hydroxy-17α - methylpregnane-6,20-dione.
7. 3β,17α-diacetoxy-5α-hydroxypregnane-6,20-dione.
8. 21-fluoro-17α-methyl-3β,5α,6β - trihydroxypregnan-20-one.
9. 3β,5α-dihydroxy-21-fluoro - 17α-methylpregnane-6,20-dione.
10. 17α,acetoxy-3β,5α-dihydroxypregnane-6,20-dione.
11. 3β-acetoxy-5α-bromopregnane-6,20-dione.
12. 3β-acetoxy-5α-bromo-17α - methtylpregnane-6,20-dione.

References Cited

Jen et al.: J. Med. & Pharm. Chem., vol. 5, pp. 876–78 (1962).

Minlon et al.: Acta Chimica Sinica, vol. 29, No. 2, pp. 99–108, p. 99 relied on, April 1963. Copy in Group 120.

Gagli et al.: J. Org. Chem., vol. 28, pp. 1207–1217, p. 1213 relied on, May 1963.

LEWIS GOTTS, *Primary Examiner.*

H. A. FRENCH, *Assistant Examiner.*